United States Patent …

(12) United States Patent
Katz et al.

(10) Patent No.: US 10,089,463 B1
(45) Date of Patent: Oct. 2, 2018

(54) MANAGING SECURITY OF SOURCE CODE

(71) Applicants: Aaron T. Katz, Haverhill, MA (US);
Daniel V. Bailey, Pepperell, MA (US);
Yavir Amar, Ramla (IL)

(72) Inventors: Aaron T. Katz, Haverhill, MA (US);
Daniel V. Bailey, Pepperell, MA (US);
Yavir Amar, Ramla (IL)

(73) Assignee: EMC IP Holding Company LLC,
Hopkinton, MA (US)

( * ) Notice: Subject to any disclaimer, the term of this patent is extended or adjusted under 35 U.S.C. 154(b) by 0 days.

(21) Appl. No.: 13/626,240

(22) Filed: Sep. 25, 2012

(51) Int. Cl.
*G06F 21/56* (2013.01)
*G06F 21/50* (2013.01)
*G06F 21/57* (2013.01)
*G06F 21/60* (2013.01)
*H04L 29/06* (2006.01)
*G06F 21/12* (2013.01)

(52) U.S. Cl.
CPC .......... *G06F 21/563* (2013.01); *G06F 21/125* (2013.01); *G06F 21/50* (2013.01); *G06F 21/57* (2013.01); *G06F 21/60* (2013.01); *H04L 63/083* (2013.01); *H04L 29/06877* (2013.01); *H04L 29/06884* (2013.01)

(58) Field of Classification Search
CPC ............. H04L 63/083; H04L 29/06877; H04L 29/06884; G06F 21/50; G06F 21/57; G06F 21/60; G06F 11/36; G06F 21/563; G06F 21/125
USPC .......................................................... 726/22
See application file for complete search history.

(56) References Cited

U.S. PATENT DOCUMENTS

| | | | | |
|---|---|---|---|---|
| 6,993,710 B1* | 1/2006 | Coad | ........................ | G06F 8/71 715/202 |
| 7,010,609 B1* | 3/2006 | Black | ..................... | G06F 9/546 709/201 |
| 7,024,593 B1* | 4/2006 | Budd et al. | ..................... | 714/48 |
| 7,725,735 B2* | 5/2010 | Fox | ........................ | G06F 21/563 713/187 |
| 7,870,075 B1* | 1/2011 | Sabet | ..................... | G06F 21/105 380/201 |
| 8,359,655 B1* | 1/2013 | Pham | ..................... | G06F 21/12 370/486 |
| 8,549,359 B2* | 10/2013 | Zheng | ................. | G06F 11/3612 714/38.11 |
| 8,589,880 B2* | 11/2013 | Jones | ........................ | G06F 8/20 717/122 |
| 8,826,222 B2* | 9/2014 | Bak | ........................ | G06F 8/71 717/101 |
| 8,990,930 B2* | 3/2015 | Burrell | .................... | G06F 21/54 726/22 |
| 9,489,290 B1* | 11/2016 | Boissy | ................ | G06F 11/3688 |
| 2002/0023257 A1* | 2/2002 | Charisius | .................. | G06F 8/20 717/106 |
| 2002/0032900 A1* | 3/2002 | Charisius | .................. | G06F 8/20 717/106 |
| 2003/0160818 A1* | 8/2003 | Tschiegg | ................ | G06Q 40/08 715/743 |

(Continued)

*Primary Examiner* — Dao Q Ho
*Assistant Examiner* — Shahriar Zarrineh
(74) *Attorney, Agent, or Firm* — Krishnendu Gupta; Jason A. Reyes

(57) ABSTRACT

A method is used in managing security of source code. Source code characteristics are derived from a source code change. Based on the source code characteristics, risk information associated with the source code change is produced.

12 Claims, 1 Drawing Sheet

(56) References Cited

U.S. PATENT DOCUMENTS

| | | | | |
|---|---|---|---|---|
| 2003/0177471 | A1* | 9/2003 | Chiu | G06F 11/3664 717/109 |
| 2005/0096953 | A1* | 5/2005 | Washington | G06Q 10/06 705/7.28 |
| 2005/0137884 | A1* | 6/2005 | Baird | G06Q 50/18 705/310 |
| 2005/0216898 | A1* | 9/2005 | Powell, Jr. | G06F 8/36 717/141 |
| 2005/0223354 | A1* | 10/2005 | Drissi | G06F 8/36 717/114 |
| 2005/0235012 | A1* | 10/2005 | Harry | G06F 8/71 |
| 2005/0289503 | A1* | 12/2005 | Clifford | G06F 8/20 717/101 |
| 2006/0041864 | A1* | 2/2006 | Holloway | G06F 11/3688 717/124 |
| 2006/0117306 | A1* | 6/2006 | Kimura | G06F 8/20 717/141 |
| 2007/0011654 | A1* | 1/2007 | Opperman | G06F 8/70 717/122 |
| 2008/0052662 | A1* | 2/2008 | Zeidman | G06F 8/20 717/100 |
| 2008/0172660 | A1* | 7/2008 | Arning | G06F 8/33 717/144 |
| 2008/0229290 | A1* | 9/2008 | Jones | G06F 8/71 717/137 |
| 2008/0263505 | A1* | 10/2008 | StClair | G06F 8/10 717/101 |
| 2009/0089869 | A1* | 4/2009 | Varghese | G06F 21/31 726/7 |
| 2009/0144698 | A1* | 6/2009 | Fanning | G06F 8/75 717/120 |
| 2009/0293121 | A1* | 11/2009 | Bigus | G06F 21/316 726/22 |
| 2010/0242028 | A1* | 9/2010 | Weigert | G06F 21/105 717/131 |
| 2010/0293519 | A1* | 11/2010 | Groves | G06F 11/3616 717/101 |
| 2011/0022551 | A1* | 1/2011 | Dixon | G06F 11/3616 706/12 |
| 2011/0307954 | A1* | 12/2011 | Melnik | H04L 63/0227 726/22 |
| 2012/0036492 | A1* | 2/2012 | Armstrong | G06F 8/30 717/100 |
| 2012/0174230 | A1* | 7/2012 | Hoyt | G06F 11/00 726/25 |
| 2012/0254827 | A1* | 10/2012 | Conrad | G06F 8/35 717/104 |
| 2013/0311968 | A1* | 11/2013 | Sharma | G06Q 10/06 717/101 |
| 2013/0340076 | A1* | 12/2013 | Cecchetti | G06F 21/55 726/23 |

\* cited by examiner

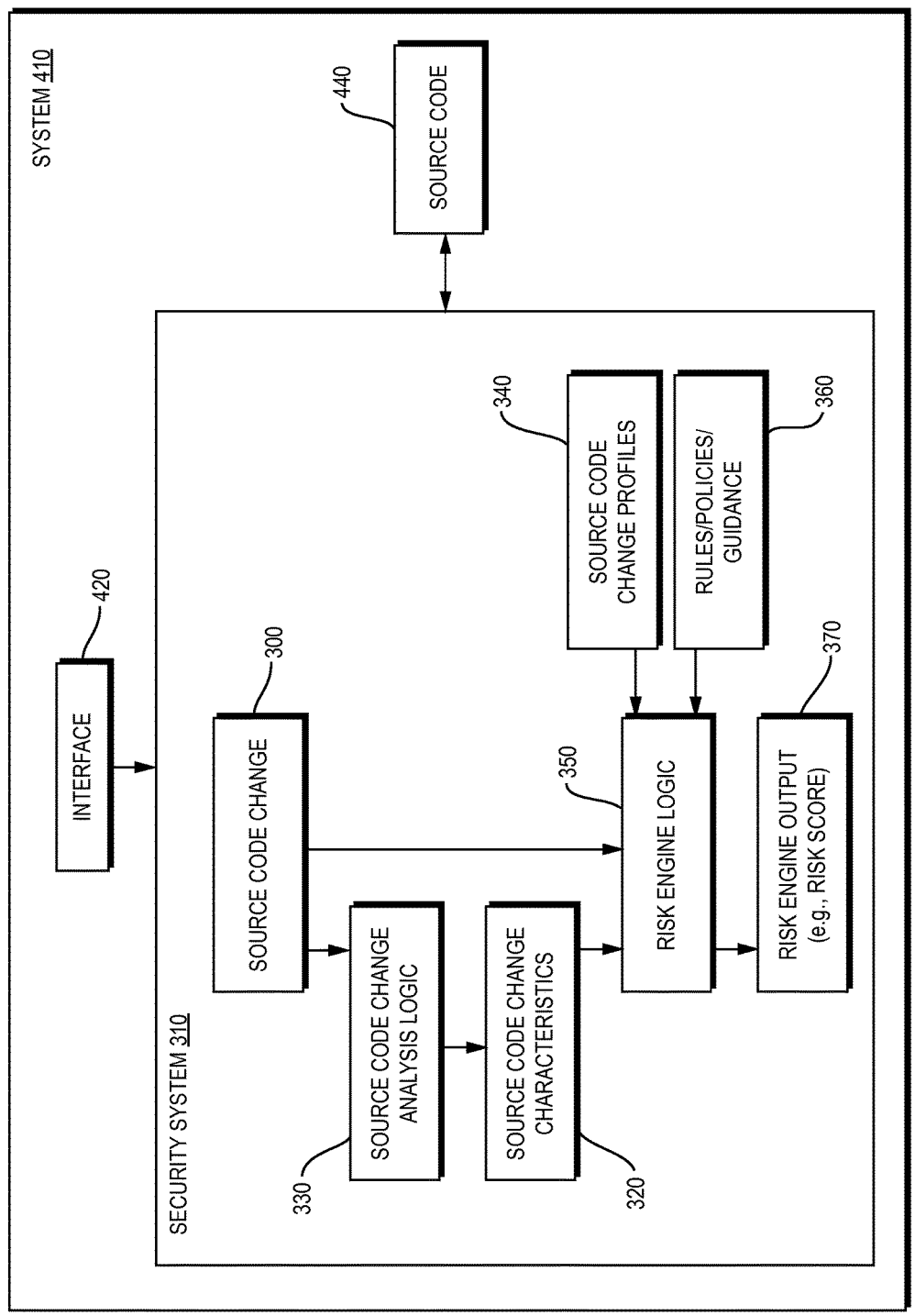

MANAGING SECURITY OF SOURCE CODE

TECHNICAL FIELD

The present invention relates to managing security of source code.

BACKGROUND OF THE INVENTION

Existing computer systems typically employ a variety of security-related functions for protection against potentially harmful user activity. For example, user authentication is often employed which requires a user to provide a password or other credentials which establishes the user's identity and protects against the possibility of an intruder or fraudster masquerading as an authorized user and engaging in harmful activity. Another type of function, referred to as access control, enforces limitations on the activities that authorized users can engage in. In one common example, access controls may be placed on certain storage devices or file system directories so that only certain users are permitted to access the data therein. Such access controls can serve to protect sensitive data from being accidentally deleted or used for an improper purpose by a user who has no legitimate need for access to the data. One dimension of access control may regard a type of user. Users can include typical or "non-privileged" users and "privileged" users who engage in more sensitive operations. Privileged users, who are normally selected in part based on perceived trustworthiness, are by definition granted greater access to system operational functions than is granted to non-privileged users.

Existing security functions may not always provide adequate protection against certain types of harmful activity. For example, the password of a user may be compromised enabling an intruder or fraudster to engage in harmful activities. In a further example, a privileged user can engage in harmful and unethical activities such as downloading sensitive information for their own benefit. It will be appreciated that such activities could cause tremendous problems and incur substantial cost to an organization.

It will also be known by those skilled in the art that so-called phishing attacks are also a substantial threat. A phishing attack usually involves an attacker or fraudster fooling the user to exchange secret data such as the log-on details. The attacker, a man-in-the-middle, uses the transmitted authentication data thereafter or simultaneously to affect a log-on procedure under the identity of the attacked authorized user and misuse the user's rights.

Organizations involved in software development may employ a software configuration management (SCM) system (which may be or include a source code control (SCC) system) for managing source code assets produced by software developers. SCM systems provide numerous benefits to these organizations, including serving as a central source code repository for storing source code assets, retaining historical information about how source code assets have evolved over time, providing access to historical versions of the source code assets, and providing a mechanism for developers to share source code with team members.

Various tools exist that extract or determine metrics associated with areas of a software system. The metrics may be indicative of complexity or other aspects of an area of the code. Developers can use the metrics to make decisions regarding which areas of the system should be revised or replaced, and priorities for such work.

There is a need for computer systems to have further security-related functions for protection against potentially harmful activity.

SUMMARY OF THE INVENTION

A method is used in managing security of source code. Source code characteristics are derived from a source code change. Based on the source code characteristics, risk information associated with the source code change is produced.

BRIEF DESCRIPTION OF THE DRAWINGS

Features and advantages of the present invention will become more apparent from the following detailed description of exemplary embodiments thereof taken in conjunction with the accompanying drawings in which:

The FIGURE is an illustration of a system that may be used with the technique herein.

DETAILED DESCRIPTION

The invention can be implemented in numerous ways, including as a process, an apparatus, a system, a computer program embodied on a computer readable storage medium, and/or a processor, such as a processor configured to execute instructions stored on and/or provided by a memory coupled to the processor. In this specification, the implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying FIGURES that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Described below is a technique for use in managing security of source code. In at least one implementation, the technique may be used to help provide, among other things, intrusion-resilient source code repositories.

At least one implementation relates to the integrity of source code, wherein coding style identification technologies are applied to identify whether the user whose account submitted a code change is really the user who made the code change. This allows the rapid identification of "unusual" code changes, which are more likely to be made while using a stolen developer account.

The technique may also be readily applied to other formats, such as blueprints, or other uses, such as security breach response activity, such as when an attacker is believed to have accessed the SCM system but it is unknown if or where changes were made. This is especially problematic if auditing is unavailable or untrustworthy, such as when an administrative SCM system account has been compromised.

The FIGURE illustrates an SCM system 410 which is an example of a system that may be used with one or more implementations of the technique described herein. System 410 is used for managing the creation and/or updating of a software product. Such a software product (or project) may be created or updated over a fairly long period of time (many weeks) and may involve large teams of programmers. The system 410 is, includes, or is included in a source code repository, and includes source code 440 and an interface 420. The repository is a database that stores the current version of the source code that comprises the product and the interface 420 provide the programmers with access to the source code stored by the source code repository. The programmers may access the repository through a local area network such as an intranet within a business. Together with a security system 310 described below, the interface 420 manages the access to the source code.

The interface 420 is also used for checking out components from the source code repository and, later, for checking in a modified version of the component to the source code repository. Components within the source code repository can be checked out of the repository by a programmer who wishes to work on that specific component. The programmer makes additions and/or amendments to the source code, and when the programmer has completed the work, the programmer checks back in the new source code through the interface 420 to the repository. In this way, the source code that makes up the project is expanded and refined over time.

System 410 also includes security system 310 that receives any inputted source code and has access to historical versioned source code of source code 440 maintained by the repository. As described below, system 310 may be applied to changes or proposed changes between the modified version of the checked in component and the original component.

System 410 maintains source code for a hardware or software system, and the repository has the ability to track "changes"—creation, deletion or modification of source code files, along with change metadata. As used herein, a source code change means any creation, deletion, or modification of one or more source code files tracked by the source code repository. Modification includes but is not limited to partial or complete modification of a source code file. Source code change metadata, as used herein, means information tracked by a source code repository that is associated with changes. Each change is associated with change metadata. Change metadata includes but is not limited to the userid under whose account the change was made, whole or part of the file that changed, the date and time when the change was made, and a source code repository comment. Each SCM system comment, also referred to as a "repository comment", is free-form text that system 410 associates with change metadata. This is different from a source code comment, in that the source code comment can be viewed only by reading the file, while the repository comment can only be viewed using tools provided by the repository or system 410; if the file is removed from the repository, it still contains the source code comments, but it does not contain the repository comments.

As described in more detail below, system 310 operates as follows. Source code change analysis logic 330 derives source code change characteristics 320 from a source code change 300. Based on change 300, characteristics 320, source code change profiles 340, and rules/policies/guidance 360, risk engine logic 350 produces risk engine output 370 which may include, for example, a risk score. Logic 350 may have or rely on logic that is based on cyclomatic complexity, afferent coupling and/or efferent coupling. For example, in at least one embodiment, logic 330 performs various analyses on change 300, generating one or more metrics included in characteristics 320. In one embodiment, logic 330 receives an intermediate language representation of source code or compiled assemblies and performs analyses thereupon. Any combination of source code, intermediate language, or compiled assemblies may be analyzed by logic 330. Metrics are a measure of a property. Metrics that are obtained by analyzing project code independent of project activity or execution of the project are referred to as "intrinsic" metrics. Some example intrinsic elements are counts of lines of code, lines of comments, conditional branch instructions, method calls, methods, arguments, or the like. Some metrics are calculated as a function of other metrics. Cyclomatic complexity is a measure of the number of linearly independent paths through a unit of the project. Halstead complexity measures are a set of metrics derived from the number of distinct operators, the number of distinct operands, the total number of operators, and the total number of operands. Afferent and efferent coupling refer respectively to the number of other classes that reference a class and the number of other classes referenced by a class.

A specific occurrence of a metric or a combination of occurrences is referred to as metrics data or a "measure." For example, for the metric of line counts, a specific source code file may have a measure of 75, and a corresponding class may have a measure of 50. In some embodiments, a measure is associated with one or more units of a project. A file is one such unit. Thus, for a particular file, there may be corresponding measure such as number of lines of source code in the file, or a Hallstead complexity measurement of the file. A particular line of a file may be a unit, such that a number of operands in the line may count as a measure corresponding to the line. The same measure may be combined with similar measures with respect to other lines of the file to obtain a measure for the file.

In at least some embodiments, the technique described herein may be used to help avoid some unfortunate conventional situations that have led to, for example, a possible backdoor having been discovered in a hardware chip, and hackers using stolen developer credentials to gain access to software repositories. In at least some of these conventional situations, hackers gained authentication credentials that provided access to development environments, and inserted malicious code changes intended to lower the security of the application. By contrast, at least some of these types of malicious code changes are identifiable by use of one or more systems based on the technique described herein.

Security of software applications relies on security of the source code. Conventionally, the ability to modify source code includes the ability to insert vulnerabilities such as backdoors, and in complex software, these vulnerabilities can be subtle and difficult to detect. Conventional software development environments may have one or both of two technical security controls relating to verification of code changes: (a) authentication to the SCM system and (b) secured production branches. If a developer's (or administrator's) account is breached, conventionally that account can be used to make source code changes. Without further controls, conventionally the source code changes go straight into the production build and any vulnerabilities are shipped to all customers.

In conventional systems, secured production branches are sometimes used to create separation of duties such that developers check into an "unstable" branch and an authorized, trusted individual (an "approver") moves checkins from "unstable" to "stable," performing a manual code review in the process. This introduces complexity to the attacker, because the attacker must either compromise the approver's account or hide the vulnerability so that it goes undetected during the code review, which conventionally may not be difficult if the approver does a poor reviewing job as a result of, for example, having a large number of lines to review, or being unfamiliar with the code base and/or security vulnerabilities.

Conventionally, remediation can be quite difficult and expensive. A large software development organization may be responsible for the maintenance of hundreds of thousands of source code files, regularly modified by authorized accounts, and conventionally it can be prohibitively expensive for such organizations to review each and every line of code, or all recent code changes after a security breach.

By contrast, a system such as system 410 in accordance with the technique described herein may include the following:

1. A series of measurements carried out by a source code repository (and included in characteristics 320, for example)
2. Profiling a user's (i.e., developer's) coding style based on textual clues (and including the profile in profiles 340, for example)
3. Upon check-in of new code (e.g., change 300), measuring the deviation from a user's normal coding style (e.g., as indicated by profiles 340) while
4. Optionally differently weighting different measurements (e.g., per guidance 360) and
5. Generating a risk score (e.g., output 370) based on the deviation and
6. Comparing the risk score to a predefined or dynamic threshold (e.g., per guidance 360).
7. If the risk score exceeds the threshold, the system chooses one or more from a plurality of responses including but not limited to:
8. alerting an administrator or an engineer
9. delaying the check-in, pending further review With respect to profiles 340, the developer's coding style can be measured and distinguished using one or more of many metrics (included in characteristics 320, for example), including but not limited to the following:

1. Typical cyclomatic complexity of the developer's code changes, when writing new functions, methods, classes or other components
2. Typical afferent coupling of the developer's code changes
3. Typical efferent coupling of the developer's code changes
4. File types that the developer typically does (or does not) edit. For example, a particular developer may never edit build files such as Maven, Ant or Make files
5. Typical type of code change (create a new file or modify an existing file)
6. Typical comment style, when adding new comments to a particular type of file. For example, multiple lines of comments may be any of the following forms in C++:

A: /*
*Multi-line comment text, skipping the first line.
*/
B: /**
*JavaDoc style, multiline comment.
*/
C: /*********************************************
*Multi-line comment with header asterisks
*/
D:
/*********************************************
*Multi-line comment with header asterisks,*
*square corners*
*********************************************/
E: /*********************************************\
*Multi-line comment with header asterisks,*
*beveled corners*
\*********************************************/
F: //////////////////////////////////////////
//Top-bordered, consecutive single-line
//comment rows to form a block comment
G: //////////////
//Section Heading
//
H: //////////////////////////////////////////
//Full bordered, consecutive single-line//
//comment rows to form a block comment.//
//////////////////////////////////////////

7. (Non-)inclusion of bug numbers or the developer's own name when writing a comment.
8. Typical length of code comments.
9. Typical ratio of comment changes to code changes
10. Typical misspellings and grammatical errors found in the developer's comments
11. Typical misspellings found in variable names declared by the developer
12. Typical naming conventions, such as use of Reverse Polish Notation, especially when deviating from the conventions already used in a particular file
13. Organizational structure of code block. For example, when writing a class, the order where the class fields, constructor, public functions/methods (such as getters and setters), and private functions/methods are defined.
14. Typical rate at which return values are checked. For example, checking if x==null immediately after assigning x=malloc(3).
15. Comments made when checking into the SCM system. This is separate from code comments, in that code comments are stored in the code file itself, while SCM comments are stored in the SCM system to describe why the check-in or deletion took place.
   a. (Non-)Inclusion of bug or other tracking numbers for which the change was made
   b. Typical length of an SCM comment
16. Use (or non-use) of a "one entry point, one exit point" coding style for all functions/methods the developer edits.
17. Use of "while" loops that directly and clearly mimic "for" loops—especially those that are simple to detect.
"while" loop
int i=0;
while(i<10) {
i++
}
equivalent "for" loop
for(int i=0; i<10; i++) {
}
18. Use of "case" statements versus nested "if" statements
19. Use of whitespace a. Indentation with specific number and/or combination of tabs and spaces
b. Newlines within a for loop, after each semicolon, or before braces
c. Whitespace between keywords and parenthesis, or between boolean tests and variables 20. Typical length of a single line of code (some developers write code that spans no more than 80 columns, while others will wrap multiple lines of code)
21. Typical number of code statements on a single line of a file. For example, taking short if statements and placing them entirely on a single line.
   if(x==y) {doSomething( );}
   compared to
   if(x==y) {
   doSomething( );
   }
22. Whether the developer uses assignment operators in boolean tests, such as
   if(x=y)
   while(x=y)
   (note the assignment operator (=) instead of the equality operator (==))
23. Typical rate of usage of standard annotations
24. Typical rate of creating custom annotations
25. Typical rate of using custom annotations
26. Typical naming of private variables with special identifiers, such as prefixing with "m_". For example, "m_variableName"
27. Typical naming of interfaces with special identifiers, such as prefixing the name with "I". For example, "IAnInterface"
28. Typical rate of usage of the "static", "private", and/or "final" keywords when defining methods For each of all or at least some developers and users who can submit code changes, these metrics/characteristics are determined and used for the purpose of creating a "coding style baseline" (e.g., included in profiles 340) against which to compare new code changes.

During operation, logic 350 utilizes change 300, characteristics 320, source code change profiles 340, and rules/policies/guidance 360 for effective risk analysis.

For example, logic 350 may generate a risk score (e.g., a result between 0 and 1000) indicating an amount of risk based on a comparison between earlier stored user behavior information (in profiles 340) in connection with the source code 440 and recently received user behavior information (as represented by characteristics 320). The technique as described herein may in this example generate a risk score indicative of a high risk. In this situation, the guidance 360 includes a predetermined threshold of certainty which comprises a threshold so that a risk score above the threshold indicates a likely hacker situation while a risk score below the threshold indicates an unlikely hacker situation.

In at least some embodiments, the risk score is a numerical value which quantitatively identifies a level of risk, and which can be compared to a tunable threshold to determine whether the change is acceptable. In at least some embodiments, logic 359 includes fuzzy logic circuitry which applies fuzzy logic analysis when evaluating change 300 and characteristics 320.

With respect to rules/policies/guidance 360, a rule may allow logic 350 to review and flag a code change as non-suspicious after having determined that the change is being submitted by the programmer and not by a hacker. System 310 can learn the programmer's behavior over time to produce a profile 340 and ultimately score the change with a much lower risk score compared with another programmer for whom the system has little or no profile information. More importantly it may be able to compare the different patterns. For example, a programmer who is known to submit changes in a particular style may still generate a higher level risk score when a change is attempted using a completely different style that may not have been previously associated with the programmer.

Advantageously, logic 350 may assign relative values to output 370 (e.g., a security alert) in order to raise or lower the importance of the event. In addition, logic 350 may potentially tag content variables. The risk engine may take these as inputs in guidance 360 and use them to process future alerts. Once the risk engine is sufficiently configured, the alerts may be processed by the risk engine for classification and triage before presentation to the administrator. The risk engine may produce a triaged and prioritized view of the alerts for the administrator.

The alert information sent to the risk engine may contain the alert summary and the parsed field data from the events which triggered the alarm. Asset information and prior risk score associated with this alert may also be sent to the risk engine.

A further advantage is that the rules 360 help to pass along the proper inputs to the risk engine. The risk engine then looks at these inputs in the context of its risk model and assigns a score. If the risk score is high enough, an alerter generates an alert that is visible to the administrator. For example, the alerter may have two paths to send an alert. One is visible to the administrator, the other is to route the alert for further consideration and processing. These choices provide confidence filtering for alerts.

In some arrangements, system 410 is implemented using a set of processors (e.g., processing boards, a microprocessor, etc.) and memory which stores, among other things, a specialized application implementing system 310. In such arrangements, system 410 forms a specialized circuit when executing the specialized application.

It should be understood that the specialized application is capable of being delivered to and installed on system 410 from a computer program product. Such a computer program product includes a non-transitory computer readable storage medium which stores, in a non-volatile manner, instructions for performing the adaptive authentication operations. Examples of suitable computer readable storage media include CD-ROM, magnetic disk or tape cartridges, flash memory, disk memory, and the like. In addition to installing the application locally, it should be understood that such specialized software may be made available as a service via the Internet (e.g., SaaS).

While the invention has been disclosed in connection with preferred embodiments shown and described in detail, modifications and improvements thereon will become readily apparent to those skilled in the art. Accordingly, the spirit and scope of the present invention should be limited only by the following claims.

What is claimed is:

1. A computer-implemented method for use in managing security of source code, the computer-implemented method comprising:
   receiving, from a user, an electronic request to submit a source code change;
   performing an analysis of one or more prior source code changes associated with the user to determine the user's typical halstead complexity measure, typical cyclomatic complexity measure, typical afferent coupling measure, and typical efferent coupling measure, wherein said halstead measure describes a coding style of the user and is derived from a number of distinct operators, a number of distinct operands, a total number of operators, and a total number of operands in connection with the one or more prior source code changes, wherein the cyclomatic complexity measure relates to a number of linearly independent paths through a unit of a project, and wherein the afferent and efferent coupling measures relate respectively to a number of other classes that reference a class and a number of other classes referenced by a class;

determining a riskiness in connection with the received source code change by measuring a deviation in the received source code change from the said measures, wherein the riskiness indicates whether the user is genuine or fraudulent; and based on the riskiness in connection with the received source code change, controlling submission of the source code change to a source code repository such that the source code change will be submitted if the riskiness indicates that the user is genuine and will be rejected if the riskiness indicates that the user is fraudulent.

2. The method of claim 1, wherein the source code change originates from a developer workstation and is submitted to a source code repository.

3. The method of claim 1, wherein the riskiness is used to help provide an intrusion-resilient source code repository.

4. The method of claim 1, wherein determining the riskiness is based on profiling a user's coding style based on textual clues.

5. The method of claim 1, wherein determining the riskiness is based on measuring the deviation in the change from a user's normal coding style.

6. The method of claim 1, wherein determining the riskiness is based on measuring the deviation in the change from file types that a user typically edits.

7. The method of claim 1, wherein determining the riskiness is based on measuring the deviation in the change from a user's typical comment style.

8. The method of claim 1, wherein determining the riskiness is based on measuring the deviation in the change from a user's typical writing errors.

9. The method of claim 1, wherein determining the riskiness is based on measuring the deviation in the change from a user's typical naming conventions.

10. A system for use in managing security of source code, the system comprising:
  memory; and
  processing circuitry coupled to the memory, the memory storing instructions which, when executed by the processing circuitry, cause the processing circuitry to:
    receive, from a user, an electronic request to submit a source code change;
    perform an analysis of one or more prior source code changes associated with the user to determine the user's typical halstead complexity measure, typical cyclomatic complexity measure, typical afferent coupling measure, and typical efferent coupling measure, wherein said halstead measure describes a coding style of the user and is derived from a number of distinct operators, a number of distinct operands, a total number of operators, and a total number of operands in connection with the one or more prior source code changes, wherein the cyclomatic complexity measure relates to a number of linearly independent paths through a unit of a project, and wherein the afferent and efferent coupling measures relate respectively to a number of other classes that reference a class and a number of other classes referenced by a class;
    determine a riskiness in connection with the received source code change by measuring a deviation in the received source code change from the said measures, wherein the riskiness indicates whether the user is genuine or fraudulent; and
    based on the riskiness in connection with the received source code change, control submission of the source code change to a source code repository such that the source code change will be submitted if the riskiness indicates that the user is genuine and will be rejected if the riskiness indicates that the user is fraudulent.

11. The system of claim 10, wherein the source code change originates from a developer workstation and is submitted to a source code repository.

12. The system of claim 10, wherein the riskiness is used to help provide an intrusion-resilient source code repository.

* * * * *